United States Patent [19]

Austin

[11] 4,282,330
[45] Aug. 4, 1981

[54] ENERGY MANAGEMENT POLYETHER POLYURETHANE FOAM

[75] Inventor: Thomas H. Austin, Austin, Tex.
[73] Assignee: Texaco Inc., White Plains, N.Y.
[21] Appl. No.: 146,961
[22] Filed: May 5, 1980

Related U.S. Application Data

[63] Continuation-in-part of Ser. No. 63,615, Aug. 3, 1979, abandoned.

[51] Int. Cl.³ .............................................. C08G 18/14
[52] U.S. Cl. .................................... 521/118; 521/164; 528/53; 528/71
[58] Field of Search .................. 521/118, 164; 528/53, 528/71

[56] References Cited

U.S. PATENT DOCUMENTS

| | | | |
|---|---|---|---|
| 2,932,621 | 4/1960 | Terry | 521/118 |
| 3,862,150 | 1/1975 | Bechara et al. | 528/53 |
| 3,988,268 | 10/1976 | Dietrich et al. | 528/71 |
| 4,086,213 | 4/1978 | Bechara et al. | 521/118 |
| 4,115,634 | 9/1978 | Bechara et al. | 528/53 |

OTHER PUBLICATIONS

Noller, *Chemistry of Organic Compounds*, Saunders, Philadelphia, 1951, pp. 494–495.

*Primary Examiner*—Maurice J. Welsh
*Attorney, Agent, or Firm*—Carl G. Ries; Robert A. Kulason; Kenneth R. Priem

[57] ABSTRACT

The incorporation of formic acid modified low equivalent weight amino polyols as crosslinkers in molded polyether polyurethane semiflexible foams is disclosed. These formic acid modified amino polyols result in foams which, when molded, display improved flowability, lower molded density and decreased usage per part. These improvements are demonstrable over nonformic acid modified low equivalent weight amino polyols and other commercial crosslinkers. The resulting foams find use in energy absorbing applications in the automotive industry and other industries.

2 Claims, No Drawings

ENERGY MANAGEMENT POLYETHER POLYURETHANE FOAM

This is a continuation-in-part of application Ser. No. 063,615 filed Aug. 3, 1979 and now abandoned.

BACKGROUND OF THE INVENTION

1. Field of the Invention

This invention relates to the production of molded polyurethane products.

2. Description of the Prior Art

No known art involves the use of carboxylic acid modified crosslinkers in molded polyurethane foams. However, carboxylic acid modified tertiary amine catalysts are known to be used as delayed action catalysts and are commercially available. However, these tertiary amine catalysts are merely catalysts and are not crosslinkers and, therefore, do not relate to the invention herein.

Examples of the catalysts are found in U.S. Pat. Nos. 4,086,213; 4,115,634 and 3,862,150. These materials are not structurally suitable to be crosslinkers and also their catalytic activity would also prevent this use.

The automotive industry, in particular, is constantly seeking new technologies for increasing the safety of vehicles, while, at the same time, decreasing the weight of the vehicles. A major part of the safety program in the automotive industry is the use of molded polyurethane foams which absorb energy upon impact. The present invention presents an improved method of preparing molded polyurethane foam which in addition to absorbing impact, are lighter in weight resulting in less vehicle weight.

SUMMARY OF THE INVENTION

The invention is a method for preparing a molded flexible polyurethane product wherein a polyol, a polyisocyanate, water and a crosslinker of the formula:

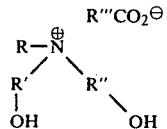

where R is an organic radical, R' and R" are alkylene radicals having from 2 to 4 carbon atoms and R''' is hydrogen or an organic radical are reacted in a closable mold. The invention is also a molded flexible polyurethane product prepared by the above method.

DESCRIPTION OF THE PREFERRED EMBODIMENTS

In the molding of polyurethane products, the reaction mixture is charged to a rigid mold which is sufficiently strong that it will not deform when subjected to the pressure within the mold after the foaming reaction starts. Such a mold can be constructed out of metal, plastic, wood or other materials and combinations of materials. In the practice of my invention, the mold should be sufficiently strong to withstand the molding pressures and also be capable of sealing to the extent that the reaction mixture is not pushed from the mold during the foaming process.

To this preheated mold is charged a sufficient quantity of the foamable polyurethane reaction mixture of my invention to overfill the mold by about 10% to about 20%. The term "overfill the mold" means that quantity of the foamable reaction mixture which is greater than the quantity necessary to just fill the mold after the reaction is complete. I use about 10% to about 20% overfill in the practice of my invention. A greater overfill is possible with very strong and tightly closed molds and would tend to increase the density of the foam.

This overfill and tightly closed mold in conjunction with the reaction mixture of my invention all combine to pack the polyurethane foam material and give an improved cell structure substantially free of voids and also an improved skin quality of the resulting product. After the material has foamed, it is allowed to stand in the mold for about three to nine minutes usually without any further external heat being necessary to cure the product. Of course, the foam product can be cured longer but longer curing is usually unnnessary. The product is removed from the mold after this short cure time and a flexible polyurethane product is recovered which has a substantially open cell structure, a good skin and is substantially free of any voids.

In order to successfully practice my invention, it is necessary to use the formulations which I have discovered.

Polyurethane foams are the reaction products of a polyether polyol component and an organic polyisocyanate. The foam is produced by conducting the above reactions catalytically in the presence of water and, optionally an inert blowing agent.

In the one shot process of my invention, the polyether polyol component, the organic polyisocyanate, water and catalyst are all brought together simultaneously and allowed to react, foam and cure in the mold without any additional high temperature curing step.

The polyether polyol component (not the crosslinker) useful for the practice of my invention may be a polyol having a functionality of from two to about six and an equivalent weight of 1,500 to about 2,200 having about 40% to about 95% primary hydroxyl groups.

The polyether polyols useful in the practice of my invention are prepared by a well known process which involves the reaction of the polyhydric initiator such as trimethylolpropane, glycerol, 1,2,6-hexane triol, sorbitol, pentaerythritol, and the like, with a lower alkylene oxide such as propylene oxide and butylene oxide, mixtures thereof, or mixtures of ethylene oxide with propylene oxide and/or butylene oxide. This reaction is carried out in a well known manner with an alkoxylation catalyst, generally an alkali metal hydroxide such as potassium hydroxide. The reaction is continued until the product of an approximate desired molecular weight is obtained. It is necessary to then react the product made as described above with ethylene oxide in order to acquire primary hydroxyl group termination of the polyether chains. This process is described in U.S. Pat. No. 3,336,242 for example. The percentage of primary hydroxyl groups terminating the polyether chain is generally increased by an addition of ethylene oxide alone; however, it will be understood that ethylene oxide mixed with some proportions of propylene oxide will also achieve this result. Also, it is within the scope of my invention to use a polyether polyol which may have blocked segments of different alkylene oxides in the molecule and not solely limiting such segments of ethylene oxide to the terminal positions.

While higher functionality polyether polyols may be used, it is especially preferred to use triols having molecular weights of 4,500 to about 6,500 and about 50% primary hydroxyl groups. Triols having molecular weights of 3,000 to about 4,500 can be used to produce an acceptable flexible polyurethane foam, it has been found that the molded foam produced has more closed cells and the foams themselves are not as resilient.

Useful polyether diols are, for example, polypropylene glycols or mixed polypropylene glycolpolyethylene glycol copolymers having a molecular weight from about 3,000 to about 5,000. These materials are produced by reacting ethylene oxide, propylene oxide, or a butylene oxide either sequentially or in admixture with an initiator such as, for example, ethylene glycol, propylene glycol or butylene glycol.

The organic polyisocyanates useful in the practice of my invention are those prepared by the phosgenation of the reaction product between aniline and formaldehyde having a functionality of 2.2 or greater. While functionalities around four and above are possible, they are not readily attainable by known processes. It is preferred to use isocyanates having functionalities of about 2.2 to about 3.5 and an especially preferred range is between 2.2 and 2.8. Isocyanates are produced by phosgenating amine precursors formed in the process described in U.S. Pat. Nos. 2,683,730 and 3,362,979, for example.

The foams of my invention also contain a reactive crosslinker. Useful crosslinkers include low equivalent weight amino polyols which have been reacted with a carboxylic acid. Use of these novel crosslinkers results in lower free rise density, lower molded density, better moldability and decreased usage (weight) per molded part. The novel crosslinkers of my invention include compounds of the formula:

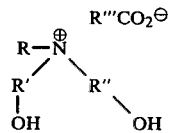

where R is an organic radical, R' and R" are alkylene radicals having from 2 to 4 carbon atoms and R''' is hydrogen or an organic radical. The crosslinker is useful in amounts ranging from about 4% to 50% based on the polyol and preferably from about 6% to 30% based on the polyol.

Useful low molecular weight amino polyols include the Mannich condensate of phenol, formaldehyde and diethanolamine; triethanolamine and generally any polyhydroxytertiary amino compound. The Mannich condensate using diethanolamine is preferred.

Any carboxylic acid is included in the scope of my invention including formic acid, acetic and, glycolic acid, adipic acid, succinic acid, and similar acids. Formic acid is preferred.

The polyol component and the organic isocyanate component are mixed in the reaction mixture in such proportions that the ratio of isocyanato groups to hydroxyl groups, commonly known as isocyanate index, is from 0.85 to about 1.15 with an especially preferred isocyanate index being about 1.05. The ratio of isocyanato groups to hydroxyl groups includes also any water that is present in the foamable reaction mixture.

Water is used to produce the blowing agent and/or adjust the density of the foam in the practice of my invention. It is preferred to use one to about four parts by weight of water per 100 parts of the polyol component and I have found that best results are obtained when the water range is from about 1.5 to about 2.5 parts by weight per 100 parts of the polyol component.

The catalysts useful in my invention include those normally employed in polyurethane foams including tertiary amines and organometallic compounds. It is within the skill of the ordinary worker in the art to choose a workable catalyst system.

For example, a partial list of useful tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., aliphatic polyamines, such as N,N,N'N'-tetramethyl-1, 3-butanediamine.

A partial list of organic tin compounds used as catalysts which are particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

The catalysts useful in the preparation of polyether polyurethane foams described herein based on the combined weight of the hydroxyl-containing compound and polyisocyanate, are employed in an amount of from about 0.05 to about 2.0 weight percent. Preferably, the amount of catalyst used is 0.1–1.5 weight percent.

The catalysts used in this invention may be used either alone or in a mixture with one or more other catalysts such as other tertiary amines or with an organic tin compound or other polyurethane catalysts.

Conventional formulation ingredients may also be employed as needed, such as, for example, foam stabilizers also known as silicone oils or emulsifiers. The foam stabilizer may be an organic silane or siloxane. For example, compounds may be used having the formula:

RSi[O—(R SiO)$_n$—(oxyalkylene)$_m$R]$_3$ wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. Selection of the proper blowing agent is well within the knowledge of those skilled in the art. See for example U.S. Pat. No. 3,072,082.

The following examples illustrate the surprising improvement of my invention over the prior art.

EXAMPLE I

Preparation of a Modified Crosslinker

A blend of ethylene glycol and the Mannich condensate of phenol, formaldehyde, and diethanolamine, was prepared using a 20:80 ratio, respectively and this blend will be referred to as Experimental Crosslinker A. To 700 g of this was added 136 g of aqueous formic acid over a period of 30 minutes with intermittent agitation, then rolled on a jar mill roller for two hours. This acid modified product will be referred to as Experimental Crosslinker B (the crosslinker of the invention).

Examples II–V illustrate the improvement and moldability and the dramatically lower densities obtainable using the carboxylic acid modified crosslinker of my invention.

EXAMPLES II, III, IV, V

In the examples shown below, the following procedure was used. The B-component ingredients were preblended and then mixed with isocyanate in a paper cup. The mixture was then poured into a second paper cup using a balance to provide exactly a 100 g pour. The observed values are shown below. The molded parts were prepared using the same procedure and the mixture was poured into a 5"×6"×8" mold to provide an overall molded density of approximately 5.5 lb/ft$^3$ (350 g). The molded foam data is shown below and the density values illustrate the extent to which the foam extruded from the mold.

|  | EXAMPLE | | | |
|---|---|---|---|---|
|  | II | III | IV | V |
| B-Component, pbw | | | | |
| THANOL ® SF-5505[1] | 78.0 | 78.0 | 78.0 | |
| THANOL ® SF-6503[1] | | | | 78.0 |
| Crosslinker A[2] | 20.0 | | | |
| Crosslinker B[2] | | 20.0 | 20.0 | 20.0 |
| Adhesion promoter[3] | 2.0 | 2.0 | 2.0 | 2.0 |
| Water | 2.35 | 2.35 | 2.60 | 2.35 |
| THANCAT ® DM-70[5] | .22 | .50 | .33 | .33 |
| THANCAT ® DD[5] | .18 | .44 | .28 | .28 |
| A-Component, pbw | | | | |
| MONDUR ® MR[4] | 86.7 | 86.7 | 85.7 | 81.3 |
| Observations | | | | |
| CT, sec.[6] | 10–15 | 8–12 | — | — |
| TOC, sec.[7] | 53 | 51 | 45 | — |
| RT, sec.[8] | 65 | 165 | | |
| Density lb/ft$^3$ | | | | |
| Free Rise, Cup | 5.96 | 3.57 | | |
| Molded, 5" × 6" × 8" | 5.42 | 4.31 | 4.31 | 4.55 |
| Demold Time, min. | 5.0 | 5.0 | 5.0 | 5.0 |

[1]Ethylene oxide/propylene oxide adduct of trihydric initiator of about 5500 and 6500 mw, product of Jefferson Chemical Co.
[2]Prepared in Example 1
[3]Used to improve foam adhesion to vinyl
[4]Product of Mobay
[5]Tertiary amine catalysts, product of Jefferson Chemical Co.
[6]CT = cream time = initial foam rise
[7]TOC = top of cup = time for foam to reach cup height
[8]RT = rise time = time for complete rise to occur Examples VI—XI illustrate the dramatic improvement in density and part wieght when the formulations including the carboxylic acid crosslinker of my invention is used in a molded flexible foam. Example XI illustrates that the use of prior art tertiary amine catalysts modified with formic acid do not give the improved results illustrated by the formic acid modified crosslinkers of my invention.

EXAMPLES VI, VII, VIII, IX, X, XI

In Examples VI-XI, the B-component ingredients were preblended, the isocyanate was added, mixed, and 100 g of the mixture was poured into a paper cup. The values obtained from the cup pour are shown below. A special mold was used to evaluate moldability. In this mold, the rising, flowing foam mixture is forced to flow through three successive U-bends with parallel channels. In this procedure, the foam mixture is poured into the mold, allowed to rise, flow, cure and is then demolded. If the foam flowed throughout the entire mold, the excess foam that is extruded is cut off and the net weight of the part is recorded. If only partial flow occurred, the weight of the part is recorded and the distance of flow down the last channel is noted. The values derived from this procedure are shown below.

|  | EXAMPLE | | | | | |
|---|---|---|---|---|---|---|
|  | VI | VII | VIII | IX | X | XI |
| B-Component, pbw | | | | | | |
| THANOL ® SF-3950[1] | 97.5 | 97.5 | 97.5 | 97.5 | 97.5 | 97.5 |
| Crosslinker A[2] | 6.0 | 3.0 | | 8.0 | | 8.0 |
| Crosslinker B[2] | | 3.0 | 6.0 | | 8.0 | |
| Adhesion promoter[3] | 2.5 | 2.5 | 2.5 | 2.5 | 2.5 | |
| Water | 2.2 | 2.2 | 2.2 | 2.2 | 2.2 | 2.2 |
| THANCAT ® DMDEE[10] | .35 | 0.8 | 1.0 | 0.3 | 0.9 | |
| THANCAT ® DD[10] | .35 | 0.8 | 1.0 | 0.3 | 0.9 | |
| THANCAT DMDEE, DD(1:1)Formate | | | | | | 1.8 |
| Carbon black[4] | 2.0 | 2.0 | 2.0 | 2.0 | 2.0 | 2.0 |
| A-Component, pbw[5] | | | | | | |
| MONDUR ® MR[6] per 100pbw | | | | | | |
| B-Comp. | 45.0 | 45.0 | 45.0 | 46.3 | 46.3 | 46.3 |
| Cup Pour | | | | | | |
| TOC, sec.[7] | 77 | 72 | 59 | 105 | 86 | 88 |
| TF, sec.[8] | 210 | 300 | 285 | 195 | 360 | 255 |
| Density, lb/ft$^3$ | 4.94 | 4.10 | 3.57 | 5.95 | 3.67 | 4.20 |
| Mold Pour | | | | | | |
| Weight poured, g | 308 | 288 | 272 | 311 | 313 | 316 |
| Part weight, g | —[9] | 281 | 247 | —[9] | 242 | 278 |
| Flow distance, in." | 5" | | | No Fill in | | |

| | EXAMPLE | | | | | |
|---|---|---|---|---|---|---|
| | VI | VII | VIII | IX | X | XI |
| -continued | | | | | | |
| | | | | | | last channel |

[1] 4000 mw diol, product of Jefferson Chemical Co.
[2] Prepared in Example 1
[3] Used to improve adhesion to vinyl
[4] Carbon black dispersed in THANOL SF-3950
[5] pbw isocyanate used with 100 parts B-Component
[6] Product of Mobay
[7] TOC = top of cup = time required for foam to reach cup height
[8] TF = tack free — time required for foam to reach state of cure where foam will not adhere to finger or probe
[9] When only partial flow occurs, the part weight is not given but rather distance in last channel.
[10] Tertiary amine catalysts, products of Jefferson Chemical Co.
[11] Only applies to foams which did not fill mold completely.

The data from Examples VI–XI above demonstrate the superior flowability which results from the use of the modified crosslinker. Note the reduced free rise densities, and the dramatic difference in the weights of the molded parts prepared in the flowability mold. Note also that reaction rate values show that the foam is cured within the prescribed time required for demold. The TF values can be related to demold time. Example XI demonstrates that a formate modified catalyst does not give the improvements that are attainable using the modified crosslinker of the invention (Examples VIII and X).

I claim:

1. In a method of preparing a molded flexible polyurethane product wherein a polyol, a polyisocyanate and water are reacted in a closable mold, the improvement which comprises:

incorporating in the reaction a crosslinker of the formula:

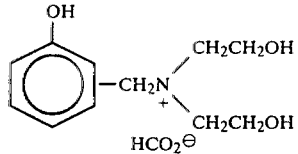

where the crosslinker is present in amounts ranging from about 6% to 30% based on the polyol.

2. A molded flexible polyurethane product comprising a polyol, a polyisocyanate, water, and a crosslinker of the formula:

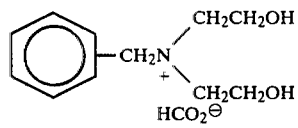

said crosslinker being present in an amount ranging from 6% to 30% based on the polyol.

* * * * *

UNITED STATES PATENT OFFICE
CERTIFICATE OF CORRECTION

PATENT NO. : 4,282,330
DATED : August 4, 1981
INVENTOR(S) : Thomas H. Austin

It is certified that error appears in the above-identified patent and that said Letters Patent are hereby corrected as shown below:

In claim 2 the formula

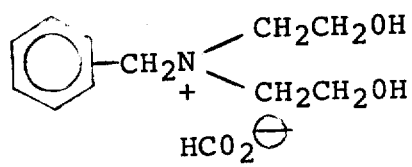

should read

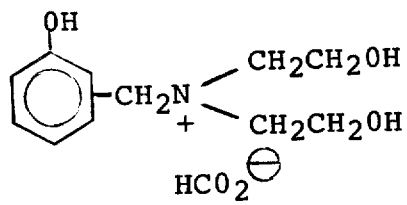

Signed and Sealed this

Twenty-sixth Day of January 1982

[SEAL]

Attest:

GERALD J. MOSSINGHOFF

Attesting Officer

Commissioner of Patents and Trademarks